US012580335B2

(12) United States Patent
Tajima

(10) Patent No.: US 12,580,335 B2
(45) Date of Patent: Mar. 17, 2026

(54) RECEPTACLE AND CONNECTOR

(71) Applicant: YOKOWO CO., LTD., Tokyo (JP)

(72) Inventor: Yasuhiro Tajima, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 328 days.

(21) Appl. No.: 18/018,595

(22) PCT Filed: Jun. 2, 2021

(86) PCT No.: PCT/JP2021/021009
§ 371 (c)(1),
(2) Date: Jan. 30, 2023

(87) PCT Pub. No.: WO2022/024546
PCT Pub. Date: Feb. 3, 2022

(65) Prior Publication Data

US 2023/0299523 A1 Sep. 21, 2023

(30) Foreign Application Priority Data

Jul. 30, 2020 (JP) ................................ 2020-129597

(51) Int. Cl.
*H01R 13/02* (2006.01)
*H01R 13/631* (2006.01)

(52) U.S. Cl.
CPC .......... *H01R 13/02* (2013.01); *H01R 13/631* (2013.01)

(58) Field of Classification Search
CPC .... H01R 13/02; H01R 13/631; H01R 13/112; H01R 13/05; H01R 13/2457; H01R 13/113

(Continued)

(56) References Cited

U.S. PATENT DOCUMENTS 6,129,571 A 10/2000 Ikemoto
6,692,316 B2 * 2/2004 Hsieh ................ H01R 13/5205 439/224

(Continued)

FOREIGN PATENT DOCUMENTS

CN 105406235 A 3/2016
CN 106486805 A 3/2017

(Continued)

OTHER PUBLICATIONS

International Search Report and Written Opinion issued Aug. 21, 2021 in corresponding International Patent Application No. PCT/JP2021/021009 (with English translation), 13 pages.

*Primary Examiner* — Tulsidas C Patel
*Assistant Examiner* — Jeffrey Mountain
(74) *Attorney, Agent, or Firm* — XSENSUS LLP

(57) ABSTRACT

A receptacle includes: a first-direction opening configured to be inserted and pulled out by a male terminal of a plug along a first direction; a second-direction opening configured to be inserted and pulled out by the male terminal along a second direction; and a female terminal configured to come into contact with the male terminal. The female terminal includes a plurality of arm portion pairs, each of which has arm portions extending the first direction and arranged to face each other, arranged in the second direction. Each of the arm portion pairs has contact positions at which each of the arm portion pairs is configured to come into contact with the male terminal inserted from the second-direction opening. The contact positions of one of the arm portion pairs are different from the contact positions of the other arm portion pairs in the first direction.

9 Claims, 7 Drawing Sheets

(58) Field of Classification Search
USPC ........................... 439/733.1, 224, 285, 924.1
See application file for complete search history.

(56) References Cited

U.S. PATENT DOCUMENTS

| | | | | |
|---|---|---|---|---|
| 10,714,856 | B2 * | 7/2020 | Huang .................. | H01R 13/11 |
| 2016/0064848 | A1 | 3/2016 | Yu et al. | |
| 2016/0254627 | A1 | 9/2016 | Byrne et al. | |
| 2017/0047682 | A1 | 2/2017 | Ho | |
| 2020/0203870 | A1 | 6/2020 | Yin et al. | |
| 2020/0243998 | A1 | 7/2020 | Deng et al. | |

FOREIGN PATENT DOCUMENTS

| | | | |
|---|---|---|---|
| CN | 209472146 | U | 10/2019 |
| CN | 111370896 | A | 7/2020 |
| EP | 1189310 | A2 | 3/2002 |
| JP | S60-067685 | U | 5/1985 |
| JP | H06-086268 | U | 12/1994 |
| JP | 2000-164271 | A | 6/2000 |
| JP | 2016-018596 | A | 2/2016 |
| TW | 201707306 | A | 2/2017 |

* cited by examiner

RECEPTACLE AND CONNECTOR

CROSS-REFERENCE TO RELATED APPLICATIONS

This application is based on PCT filing PCT/JP2021/021009, filed Jun. 2, 2021, which claims priority to JP 2020-129597, filed Jul. 30, 2020, the entire contents of each are incorporated herein by reference.

TECHNICAL FIELD

The present invention relates to a receptacle and a connector.

BACKGROUND ART

A connector structure including a plug and a receptacle is well known. Each of the plug and the receptacle includes a conductive terminal. When a user performs connection work of the connector, a male terminal of the plug is inserted into while being in sliding contact with a female terminal of the receptacle so as to be electrically connected to the female terminal. When the user pulls out the plug from the receptacle, the male terminal is pulled out from the female terminal while being in sliding contact with the female terminal, so that the electrical connection is released.

Since it is premised that the insertion and pulling-out are repeated depending on an application of the connector, the terminals of the connector for such an application are devised to prevent wear of a contact point due to repeated sliding contact. For example, Patent Literatures 1 and 2 each disclose a technique related to a plug for preventing wear.

CITATION LIST

Patent Literature

Patent Literature 1: JP2016-18596A
Patent Literature 2: JP2000-164271A

SUMMARY OF INVENTION

Technical Problem

Depending on the connector, there is a case where one terminal is required to have a plurality of electrical contact points from a viewpoint of an assumed current and robustness of connection maintenance. In general, there is one insertion and pulling-out direction of the connector, but there is a demand to make one connector compatible with a plurality of insertion and pulling-out directions from a viewpoint of reduction of manufacturing cost and commonality of components. In a case where female terminals of the receptacle are arranged as a plurality of pairs of facing terminals in order to implement a connector corresponding to a larger current, when a plug is inserted and pulled out from a direction in which the plurality of pairs of facing terminals arranged overlap each other, contact positions of the male terminal of the plug and each pair of facing terminals take the same trajectory. Therefore, wear of the same portion of the plug male terminal becomes severe, and there is a problem in durability.

An example of an object of the present invention is to suppress wear of a contact point of a male terminal of a plug due to sliding contact in a case where the plug is inserted and pulled out from a direction in which a plurality of pairs of facing terminals arranged overlap with each other, thereby improving durability of the male terminal of the plug. Further, an object of the present invention to provide a receptacle capable of coping with a plurality of insertion and pulling-out directions and a large current.

Solution to Problem

An aspect of the present disclosure is a receptacle including: a first-direction opening configured to be inserted and pulled out by a male terminal of a plug along a first insertion and pulling-out direction; a second-direction opening configured to be inserted and pulled out by the male terminal along a second insertion and pulling-out direction different from the first insertion and pulling-out direction; and a female terminal configured to come into contact with the male terminal inserted from the first-direction opening or the second-direction opening. The female terminal includes a plurality of arm portion pairs, each of which has arm portions extending the first insertion and pulling-out direction and arranged to face each other, arranged in the second insertion and pulling-out direction. Each of the arm portion pair has contact positions at which each of the arm portion pairs is configured to come into contact with the male terminal inserted from the second-direction opening. The contact positions of one of the arm portion pairs are different from the contact positions of the other arm portion pairs in the first insertion and pulling-out direction.

According to this aspect, it is possible to implement the receptacle having the plurality of openings that are referred to as the first direction opening and the second direction opening, and capable of receiving insertion and pulling-out of the male terminal from each of the first insertion and pulling-out direction and the second insertion and pulling-out direction different from each other. The receptacle has contact positions at which the arm portion pairs of the female terminal come into contact with the male terminal. Thus, electrical connection can be realized at the plurality of contact positions. The plurality of contact positions are located at different positions in the first insertion and pulling-out direction. Therefore, since the positions of sliding contact differ as insertion and pulling-out from the second insertion and pulling-out direction are performed, contact wear can be suppressed as compared with a case where the plurality of sliding contact positions overlap.

DESCRIPTION OF EMBODIMENTS

Hereinafter, examples of preferred embodiments of the present invention will be described. However, a mode to which the present invention can be applied is not limited to the following embodiments.

Figure 1A:
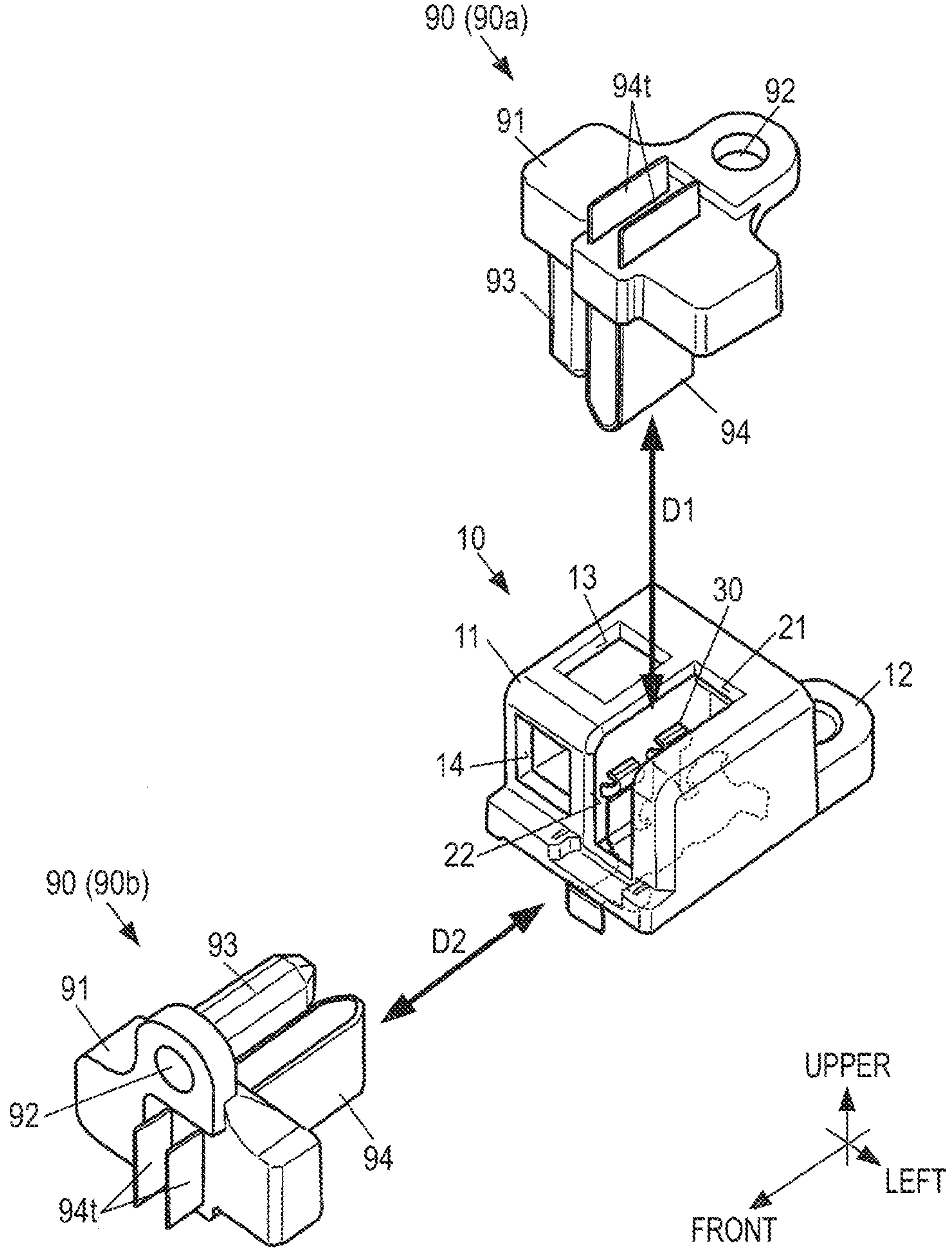
FIG. 1A is a perspective view of a receptacle and plugs according to the present embodiment.
Figure 1B:
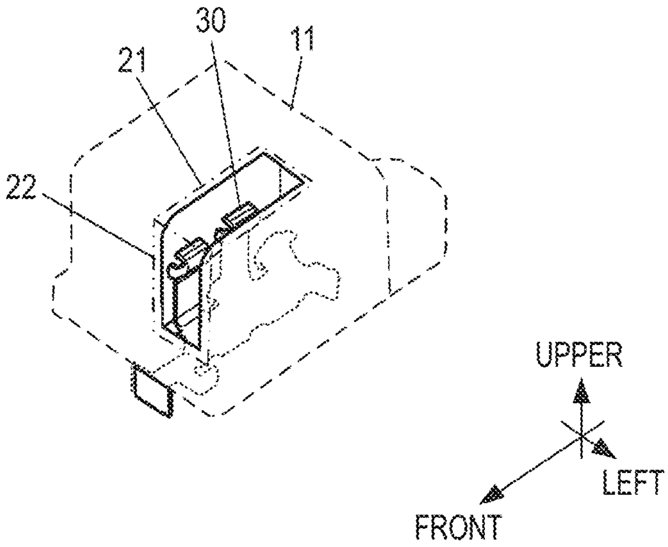
FIG. 1B is a perspective view of the receptacle according to the present embodiment.

FIG. 1A is a perspective view showing a receptacle 10 of the present embodiment and plugs 90 of the present embodiment that can be inserted into and pulled out from the receptacle 10 in both a first insertion and pulling-out direction D1 and a second insertion and pulling-out direction D2. FIG. 1A shows the two plugs 90, that is, a plug 90 (90*a*) in a case of being inserted and pulled out along the first insertion and pulling-out direction D1 and a plug 90 (90*b*) in a case of being inserted and pulled out along the second insertion and pulling-out direction D2. However, in actual operation, one plug 90 is used by being inserted and pulled out from any one of the insertion and pulling-out directions. FIG. 1B is a diagram explicitly showing the female terminal 30, a first-direction opening 21, and a second-direction opening 22 in the receptacle 10 shown in FIG. 1A. In FIG. 1B, an outer shape of a housing 11 of the receptacle 10 is indicated by a broken line, and the first-direction opening 21 and the second-direction opening 22 are indicated by alternate long and short dash lines.

Figure 2:
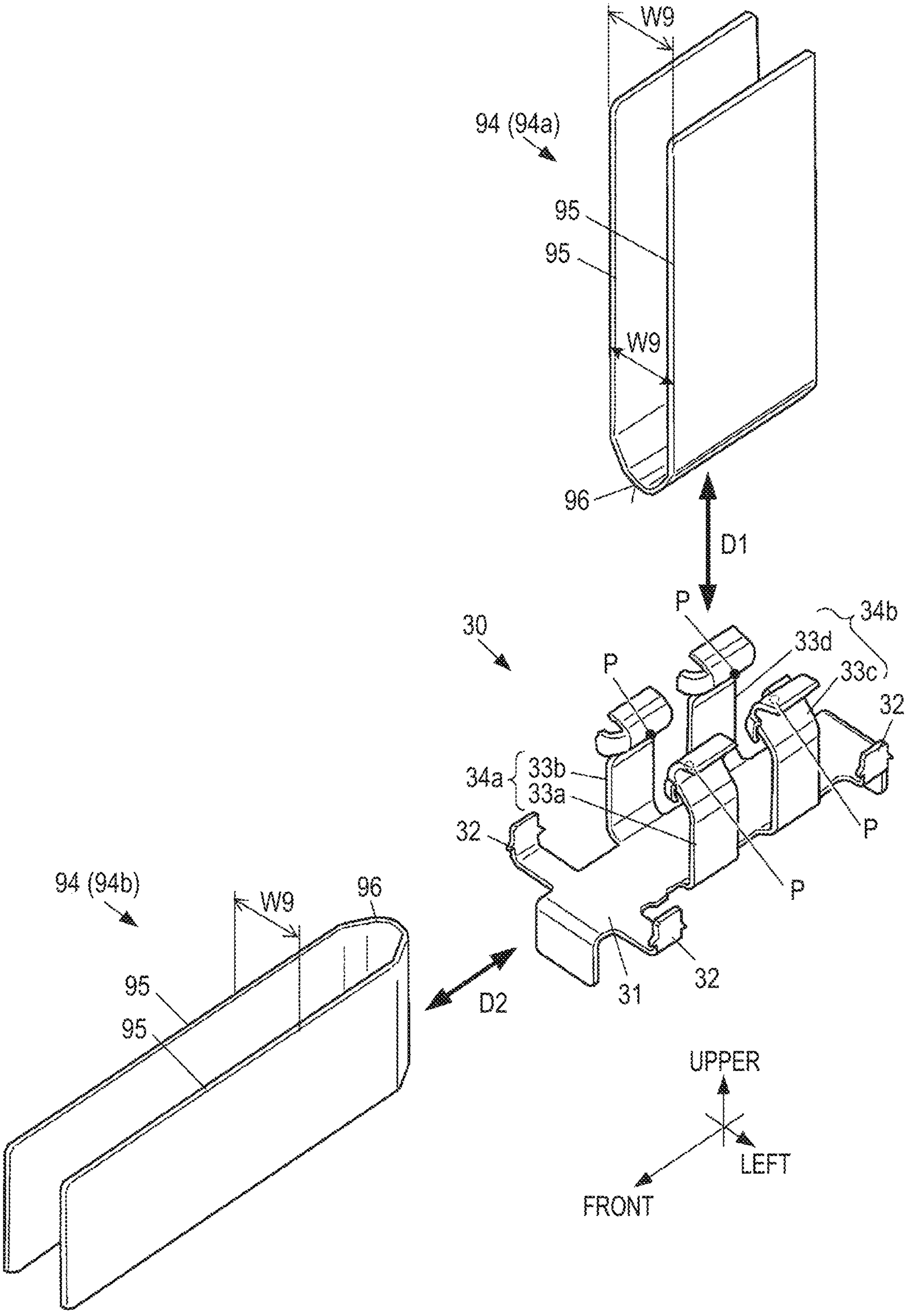
FIG. 2 is a perspective view of a female terminal of the receptacle of the present embodiment and male terminals of the plugs of the present embodiment.

FIG. 2 is a perspective view showing the female terminal 30 of the receptacle 10 of the present embodiment and male terminals 94 of the plugs 90 of the present embodiment. FIG. 2 shows the two male terminals 94, that is, a male terminal 94 (94*a*) in the case of being inserted and pulled out along the first insertion and pulling-out direction D1 and a male terminal 94 (94*b*) in the case of being inserted and pulled out along the second insertion and pulling-out direction D2. However, in the actual operation, one male terminal 94 is inserted and pulled out from any of the insertion and pulling-out directions.

First, a configuration of the plug 90 will be described.

As shown in FIG. 1A, the plug 90 includes a non-conductive housing 91, a bolt hole portion 92 extending from the housing 91, a guide protrusion 93, and a male terminal 94 protruding in the same direction as the guide protrusion 93.

As shown in FIG. 2, the male terminal 94 includes two flat portions 95 and an insertion end portion 96 that connects protrusion-side ends of the two flat portions 95 with a curved surface that is convex in a protrusion direction. The male terminal 94 is formed, for example, by bending a conductive metal plate. Opposite end portions 94*t* (see FIG. 1A) on an opposite side of the insertion end portion 96 are exposed through the housing 91.

In the plug 90, when the housing 91 is fixed to a cable end portion or a control board by using the bolt hole portion 92, the opposite end portions 94*t* of the male terminal 94 exposed through the housing 91 comes into contact with an electric circuit (for example, a terminal) on a fixed side to form an electric circuit leading to the male terminal 94.

Next, a configuration of the receptacle 10 will be described.

As shown in FIGS. 1A and 1B, the receptacle 10 includes the housing 11, a bolt insertion portion 12, a first guide hole 13, a second guide hole 14, the first-direction opening 21, the second-direction opening 22, and the female terminal 30. The housing 11 has a hollow box shape made of a non-conductive material. The bolt insertion portion 12 extends to a lower portion of a rear surface of the housing 11. The first guide hole 13 is formed to penetrate the housing 11 at a position on a right side of an upper surface of the housing 11. The second guide hole 14 is formed to penetrate the housing 11 at a position on a right side of a front surface of the housing 11. The first-direction opening 21 is opened upward in the upper surface of the housing 1. The second-direction opening 22 is opened forward in the front surface of the housing 11. The female terminal 30 is attached to an internal space of the housing 11 continuous with the first-direction opening 21 and the second-direction opening 22.

The bolt insertion portion 12 is used for inserting a bolt or a screw for fixing the receptacle 10.

The first guide hole 13 receives the guide protrusion 93 protruding from the housing 91 of the plug 90 and guides the guide protrusion 93 in the first insertion and pulling-out direction D1. Accordingly, the position and the direction for inserting the plug 90 into the receptacle 10 are aligned, and insertion of the male terminal 94 into the first-direction opening 21 is smoothly promoted. The second guide hole 14 receives the guide protrusion 93 of the plug 90 and guides the guide protrusion 93 in the second insertion and pulling-out direction D2. Accordingly, the position and the direction for inserting the plug 90 into the receptacle 10 are aligned, and insertion of the male terminal 94 into the second-direction opening 22 is smoothly promoted.

A front side of the first-direction opening 21 and an upper side of the second-direction opening 22 communicate with each other. In other words, the first-direction opening 21 and the second-direction opening 22 are configured as a continuous L-shaped opening.

The first-direction opening 21 is an opening through which the male terminal 94 of the plug 90 is inserted and pulled out along the first insertion and pulling-out direction D1 (the upper-lower direction of the receptacle 10), and has an opening shape capable of receiving the male terminal 94 from the first insertion and pulling-out direction D1.

The second-direction opening 22 is an opening through which the male terminal 94 is inserted and pulled out along a second insertion and pulling-out direction D2 (a direction orthogonal to the first insertion and pulling-out direction; a front-rear direction of the receptacle 10) intersecting the first insertion and pulling-out direction D1, and has an opening shape capable of receiving the male terminal 94 from the second insertion and pulling-out direction D2.

Figure 3:
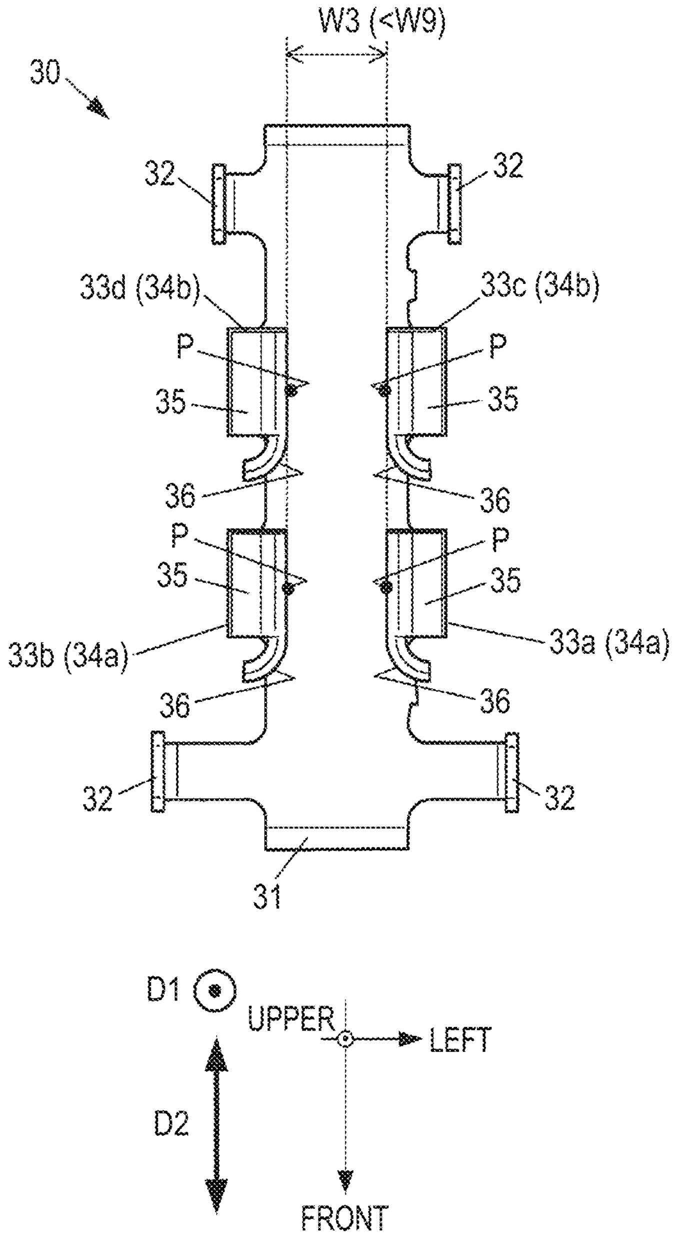
FIG. 3 is a top view of the female terminal according to the present embodiment.
Figure 4:
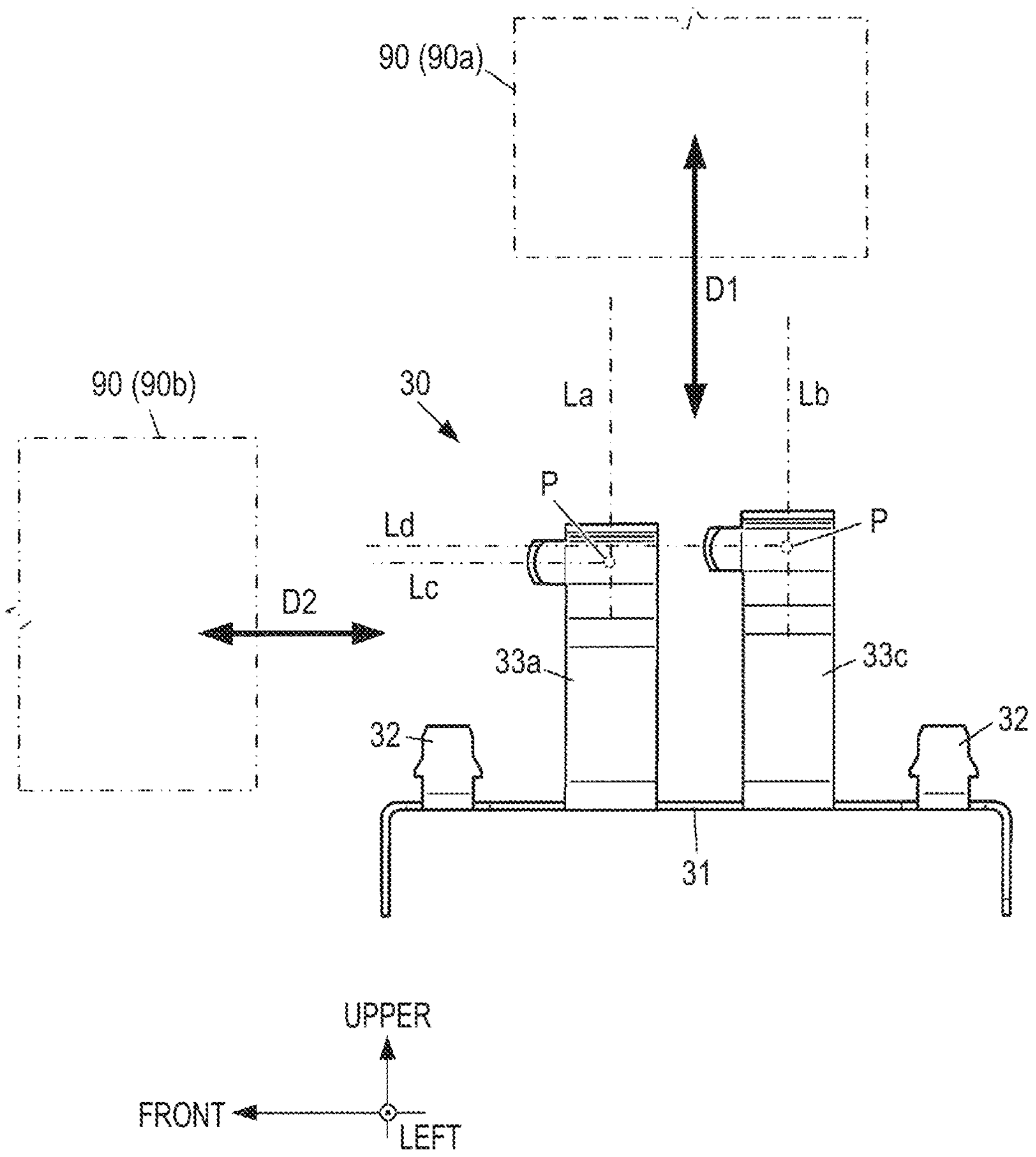
FIG. 4 is a left side view of the female terminal according to the present embodiment.
Figure 5:
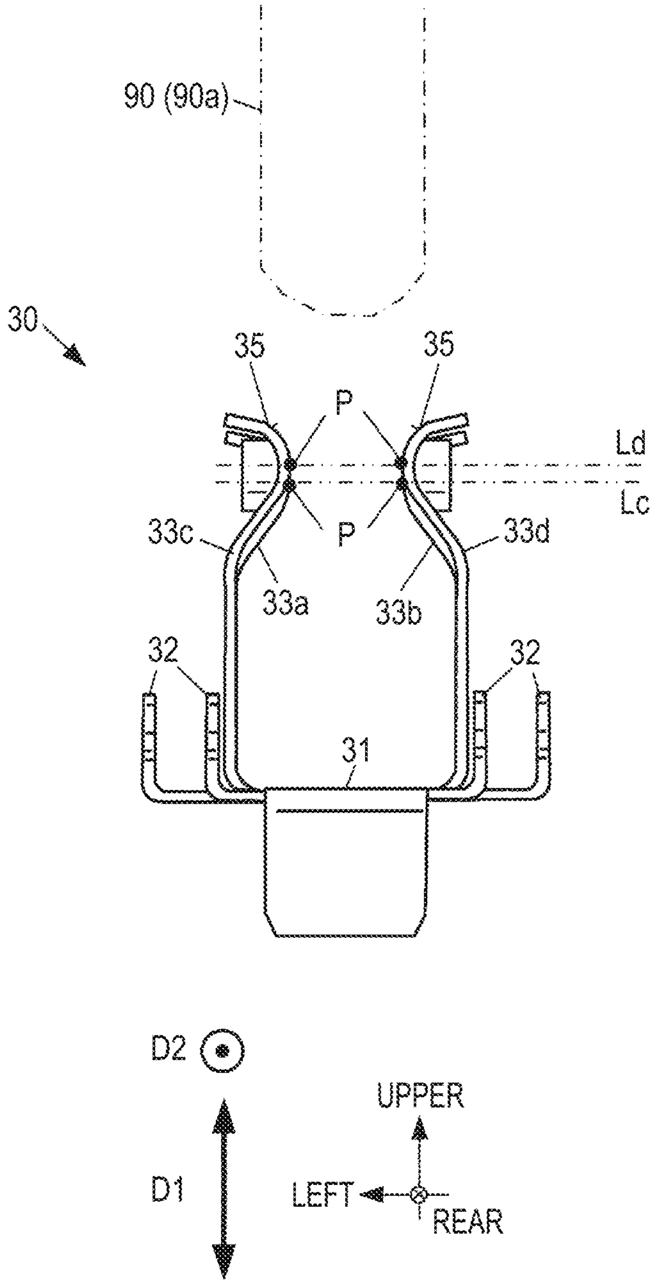
FIG. 5 is a rear view of the female terminal according to the present embodiment.

FIG. 3 is a top view of the female terminal 30. FIG. 4 is a left side view of the female terminal 30. FIG. 5 is a rear view of the female terminal 30. As shown in FIGS. 2 to 5, the female terminal 30 is a component for forming an electric circuit by coming into contact with the male terminal 94 inserted from the first-direction opening 21 or the second-direction opening 22. The female terminal 30 is formed by sheet metal processing of a conductive metal material.

Specifically, the female terminal 30 includes a base portion 31, engagement pieces 32, and four arm portions 33*a* to 33*d*. The engagement piece 32 extends from the base portion 31. The arm portions 33*a* to 33*d* extend from the base portion 31 in the first insertion and pulling-out direction D1. The four arm portions 33*a* to 33*d* are a first arm portion 33*a*, a second arm portion 33*b*, a third arm portion 33*c*, and a fourth arm portion 33*d*.

The base portion 31 has a flat shape elongated in the front-rear direction, and is engaged with and fixed to the housing 11 by the engagement pieces 32.

Regarding lengths of the arm portions 33*a* to 33*d* in the first insertion and pulling-out direction D1 (upper-lower direction), the first arm portion 33*a* and the second arm portion 33*b* have the same first length, and the third arm portion 33*c* and the fourth arm portion 33*d* have the same second length longer than the first length.

The first arm portion 33*a* extends upward from a left side portion of the base portion 31, and the second arm portion 33*b* extends upward from a right side portion of the base portion 31. These arm portions 33*a* and 33*b* are disposed to face each other with the base portion 31 interposed therebetween, and form a first arm portion pair 34*a*.

The third arm portion 33*c* and the fourth arm portion 33*d* are provided at positions behind the first arm portion 33*a* and the second arm portion 33*b* in the second insertion and pulling-out direction D2 (the front-rear direction). The third arm portion 33*c* extends from the left side portion of the base portion 31, and the fourth arm portion 33*d* extends from the right side portion of the base portion 31. These arm portions 33*c* and 33*d* are disposed to face each other with the base portion 31 interposed therebetween, and form a second arm portion pair 34*b*.

The plurality of arm portion pairs are disposed along the second insertion and pulling-out direction D2 in a way that the first arm portion pair 34*a* is on a front side and the second arm portion pair 34*b* is on a rear side. In the first insertion and pulling-out direction D1 (upper-lower direction), points P are located at different positions in the first insertion and pulling-out direction D1 (upper-lower direction) for each (each pair) of the first arm portion pair 34*a* and the second arm portion pair 34*b*. Although the point P is shown in the drawing in a form of a black dot for convenience of understanding, a contact position with a flat portion 95 of the male terminal 94 is a line of an entire width in the front-rear direction of each of the arm portions 33*a* to 33*d* including the point P. The contact position is not limited to line contact and may be point contact or surface contact.

The point P is located in the vicinity of an upper tip end of each of the arm portions 33*a* to 33*d*, and indicates a position where a distance between each of the arm portion pairs 34*a*. 34*b* in a left-right direction is the narrowest.

The arm portion pairs 34*a*, 34*b* each include first inclined portions 35 at end portions on a side close to the first-direction opening 21 of the facing arm portions 33*a* to 33*d*. The first inclined portions 35 widen a distance between the arm portion 33*a* and the arm portion 33*b* and a distance between the arm portion 33*c* and the arm portion 33*d* in the left-right direction of the female terminal 30 toward the first-direction opening 21. The arm portion pairs 34*a*, 34*b* each include second inclined portions 36 at end portions on a side close to the second-direction opening 22 of the facing arm portions 33*a* to 33*d*. The second inclined portions 36 widen a distance between the arm portion 33*a* and the arm portion 33*b* and a distance between the arm portion 33*c* and the arm portion 33*d* in the left-right direction of the female terminal 30 toward the second-direction opening 22.

The second inclined portions 36 extend from the points P of the arm portions 33*a* to 33*d* toward the second-direction opening 22, and the surfaces of the second inclined portions 36 are continuous to the points P.

The point P in each of the arm portions 33*a* to 33*d*, the first inclined portion 35, and the second inclined portion 36 are formed in a continuous bent shape, and are formed by sheet metal processing.

The point P is a portion where a facing distance (left-right direction distance W3 (see FIG. 3)) of the first inclined portions 35 of the facing arm portions 33*a* to 33*d* is the smallest, and corresponds to a portion where a facing distance (left-right direction distance W3) of the facing second inclined portions 36 is also the smallest. The left-right direction distance W3 of the points P is set to be smaller than a left-right direction width W9 (see FIG. 2) of the plug 90.

<Operation of Inserting Plug 90 from First Insertion and Pulling-Out Direction D1>

In order to connect the plug 90 to the receptacle 10, when the plug 90 is brought closer to the receptacle 10 in the first insertion and pulling-out direction D1, and the guide protrusion 93 is inserted into the first guide hole 13, the first guide hole 13 guides the plug 90 in the direction D1 while maintaining an insertion posture of the plug 90. The insertion posture of the plug 90 at this time is a posture in which the insertion end portion 96 of the male terminal 94 is inserted between the arm portions 33*c* and 33*d* constituting the arm portion pair 34*b* from the first-direction opening 21, and then the insertion end portion 96 is inserted between the arm portions 33*a* and 33*b* constituting the arm portion pair 34*a*.

At this time, the width W9 (see FIG. 2) of the male terminal 94 in the left-right direction is larger than the distance W3 (see FIG. 3) between the points P in the left-right direction. Therefore, when the insertion end portion 96 is inserted between the arm portions 33*c* and 33*d* constituting the arm portion pair 34*b*, the male terminal 94 comes into contact with the first inclined portions 35 of the arm portions 33*c*, 33*d*. Then, the insertion proceeds while the arm portions 33*c* and 33*d* are pushed and expanded in the left-right direction. Thereafter, the insertion end portion 96 is inserted between the arm portions 33*a* and 33*b* constituting the arm portion pair 34*a*, the male terminal 94 abuts against the first inclined portions 35 of the arm portions 33*a*, 33*b*, and the insertion proceeds while the arm portions 33*a*, 33*b* are pushed and expanded in the left-right direction.

In this insertion process, the male terminal 94 comes into contact with the first inclined portion 35 of each of the four arm portions 33*a* to 33*d* of the female terminal 30, and then comes into contact with the lines of the entire width in the front-rear direction of the arm portions 33*a* to 33*d* including the point P of each of the arm portions 33*a* to 33*d*. Since the contact position is linear in the entire width of each of the four arm portions 33*a* to 33*d* in the front-rear direction, wear of the male terminal 94 (flat portions 95) due to sliding contact at the time of insertion is suppressed.

As shown in FIG. 4, the contact positions between the first arm portion pair 34*a* (the first arm portion 33*a* and the second arm portion 33*b*) and the male terminal 94 transition parallel to the first insertion and pulling-out direction D1 in the entire width of the first arm portion 33*a* and the second arm portion 33*b* including a first position La in the front-rear direction. The contact positions between the second arm portion pair 34*b* (the third arm portion 33*c* and the fourth arm portion 33*d*) and the male terminal 94 transition parallel to the first insertion and pulling-out direction D1 in the entire width of the third arm portion 33*c* and the fourth arm portion 33*d* including a second position Lb in the front-rear direction.

Since the contact positions of the first arm portion pair 34*a* and the contact positions of the second arm portion pair 34*b* are shifted in the front-rear direction, the contact positions on the male terminal 94 side are different. Accordingly, since the sliding contact positions with the first arm portion pair 34*a* and the second arm portion pair 34*b* when the male terminal 94 is inserted from the first insertion and pulling-out direction D1 have different trajectories, it is possible to suppress the wear of the terminal due to the sliding contact.

<Operation of Inserting Plug 90 from Second Insertion and Pulling-Out Direction D2>

When the plug 90 is brought closer to the receptacle 10 in the second insertion and pulling-out direction D2 and the guide protrusion 93 is inserted into the second guide hole 14, the second guide hole 14 guides the plug 90 in the direction D2 while maintaining the insertion posture of the plug 90. The insertion posture of the plug 90 at this time is a posture in which the insertion end portion 96 of the male terminal 94 is inserted between the arm portions 33*a* and 33*b* constituting the arm portion pair 34*a* from the second direction opening 22, and then the insertion end portion 96 is inserted between the arm portions 33*c* and 33*d* constituting the arm portion pair 34*b*.

At this time, the width W9 (see FIG. 2) of the male terminal 94 in the left-right direction is larger than the distance W3 (see FIG. 3) between the points P in the left-right direction. Therefore, the insertion end portion 96 of the male terminal 94 comes into contact with the second inclined portions 36 of the first arm portion pair 34*a* (the first arm portion 33*a* and the second arm portion 33*b*), and the flat portions 95 of the male terminal 94 come into contact with the contact positions including the second inclined portions 36 and the points P while the first arm portion pair 34*a* is pushed and expanded in the left-right direction. Thereafter, the male terminal 94 comes into contact with the second inclined portions 36 of the second arm portion pair 34*b* (the first arm portion 33*c* and the second arm portion 33*d*). Then, the second arm portion pair 34*b* is pushed and widened in the left-right direction, and the flat portion 95 of the male terminal 94 comes into contact with the contact position including the second inclined portion 36 and the point P, and the insertion proceeds.

In this insertion process, the second inclined portion 36 extends to a front side of the point P, and the surface of the second inclined portion 36 is smoothly connected to the contact position including the point P. Therefore, since the contact position transitions from the second inclined portion 36 without a step or a seam, collision wear due to the step or the seam does not occur.

The transition of the contact positions between the male terminal 94 and the female terminal 30 is as shown in FIGS. 4 and 5. That is, the contact positions between the first arm portion pair 34*a* (the first arm portion 33*a* and the second arm portion 33*b*) and the male terminal 94 transition parallel to the second insertion and pulling-out direction D2 at a third position Lc in the upper-lower direction. The contact positions between the second arm portion pair 34*b* (the third arm portion 33*c* and the fourth arm portion 33*d*) and the male terminal 94 transition parallel to the second insertion and pulling-out direction D2 at a fourth position Ld in the upper-lower direction.

The contact position of the first arm portion pair 34*a* and the contact position of the second arm portion pair 34*b* are shifted in the upper-lower direction, and the contact positions on the male terminal 94 side are different. When the male terminal 94 is inserted in the second insertion and pulling-out direction D2, since the first arm portion pair 34*a* and the second arm portion pair 34*b* come into sliding contact at different positions, it is possible to suppress wear of the male terminal 94 (flat portions 95).

OTHER EMBODIMENTS

Although several embodiments have been described above, the mode to which the present invention can be applied is not limited to the above embodiments, and constituent elements can be appropriately added, omitted, or changed.

For example, in the above embodiment, two sets of arm portion pairs 34*a*, 34*b* including four arm portions 33*a* to 33*d* are exemplified. However, it is also possible to configure three sets of arm portion pairs including six arm portions.

Further, in the above embodiment, the insertion and pulling-out directions are exemplified as two directions of the first insertion and pulling-out direction D1 and the second insertion and pulling-out direction D2, but the insertion and pulling-out directions may be three directions. Specifically, a third-direction opening that opens toward a rear of the receptacle 10 is added, and an upper end of the third-direction opening is connected to a rear end of the first-direction opening 21 (see FIGS. 1A and 1B). A configuration similar to that of the second inclined portion 36 may be added to the arm portion 33*a* to 33*d* toward the third-direction opening.

Figure 6:
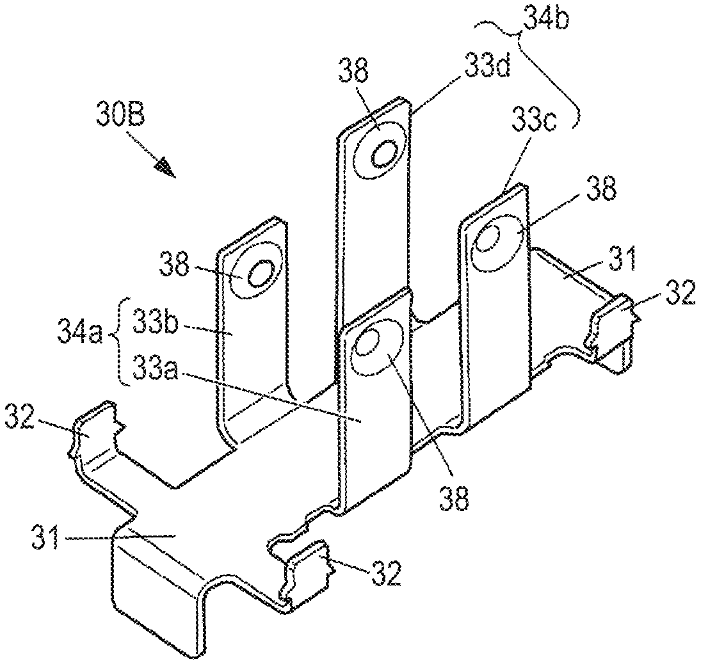
FIG. 6 is a perspective view of a female terminal according to another embodiment.

In the above embodiment, the first inclined portion 35 and the second inclined portion 36 are formed as separate extending and curved portions, but a configuration in which the first inclined portion 35 and the second inclined portion 36 are integrally formed is also possible. For example, as in a female terminal 30B shown in FIG. 6, substantially hemispherical convex portions 38 protruding in the facing direction of the arm portion pairs 34*a*. 34*b* are formed in the vicinity of upper ends of the arm portions 33*a* to 33*d*. An end portion of a facing surface of the convex portion 38 is a contact position including the point P. An inclined surface of the convex portion 38 on a first insertion and pulling-out direction D1 side functions as the first inclined portion 35, and an inclined surface of the convex portion 38 on the second insertion and pulling-out direction D2 side functions as the second inclined portion 36.

In the above embodiment, the term "receptacle" is used as an example, but the term "receptacle" is merely a term for convenience. The form of another name such as a jack is also the same embodiment.

The disclosure of the present specification including the embodiments and the modifications thereof described above can be summarized as follows.

An aspect of the present disclosure is a receptacle including: a first-direction opening configured to be inserted and pulled out by a male terminal of a plug along a first insertion and pulling-out direction; a second-direction opening configured to be inserted and pulled out by the male terminal along a second insertion and pulling-out direction different from the first insertion and pulling-out direction; and a female terminal configured to come into contact with the male terminal inserted from the first-direction opening or the second-direction opening, in which the female terminal includes a plurality of arm portion pairs, each of which has arm portions extending the first insertion and pulling-out direction and arranged to face each other, arranged in the second insertion and pulling-out direction, each of the arm portion pair has contact positions at which the arm portion pairs are configured to come into contact with the male terminal inserted from the second-direction opening, and the contact positions of one of the arm portion pairs are different from the contact positions of the other arm portion pairs in the first insertion and pulling-out direction.

According to the aspect of the present disclosure, it is possible to implement the receptacle having the plurality of openings that are referred to as the first direction opening and the second direction opening, and capable of receiving insertion and pulling-out of the male terminal from each of the first insertion and pulling-out direction and the second insertion and pulling-out direction different from each other. Since the receptacle has contact positions at which each of the arm portion pairs of the female terminal comes into contact with the male terminal, electrical connection can be realized at the plurality of contact positions. The plurality of contact positions are located at different positions in the first insertion and pulling-out direction. Therefore, since the positions of sliding contact differ as insertion and pulling-out from the second insertion and pulling-out direction are performed, contact wear can be suppressed as compared with a case where the plurality of sliding contact positions overlap.

The contact positions may be disposed in a vicinity of a tip end of the arm portions, respectively and a length of one of the arm portion pairs may have is different from lengths of the other the arm portion pairs in the first insertion and pulling-out direction.

Accordingly, it is possible to easily provide the contact positions in the insertion and pulling-out from the second insertion and pulling-out direction at different positions. Therefore, it is possible to suppress the contact wear related to the sliding contact of the plurality of contact points in the insertion and pulling-out in the second insertion and pulling-out direction.

The arm portions include two of the arm portions, and the contact positions are respectively provided on both the two of the arm portions facing each other and have a protruding shape facing each other.

Accordingly, since the plurality of contact positions have a positional relationship in which they face each other with the male terminal interposed therebetween, it is possible to obtain an effect of holding the male terminal and maintaining a strong electrical connection.

Each of the arm portion pairs may include first inclined portions configured to be widen a facing distance toward the first-direction opening at end portions on a side close to the first-direction opening of the facing arm portions, and second inclined portions configured to be widen a facing distance toward the second-direction opening at end portions on a side close to the second-direction opening of the facing arm portions.

Accordingly, when the male terminal of the plug is inserted, it is possible to reduce damage to the end portion of each arm portion close to the opening due to contact with the male terminal and abrasion of the male terminal due to end face contact.

The second inclined portions may extend from the contact positions of the arm portions toward the second-direction opening, respectively.

Accordingly, the contact position between the male terminal and the female terminal can be smoothly guided from the second inclined portion to the contact position, and the wear due to the sliding contact can be reduced as compared with a configuration in which the contact position from the second inclined portion to the contact position is interrupted. In addition, since the second inclined portion is formed in a shape continuous with the second-direction opening side of the contact position, the shape around the contact position can be reinforced, and the formation of the second inclined portion can be configured such that the second inclined portion does not affect elasticity of a main portion of the arm portion (the portion that extends from the base portion in the first insertion and pulling-out direction, receives the male terminal by being elastically deformed at the time of insertion, and secures an elastic force for clamping the male terminal between the contact points).

The contact positions, the first inclined portions, and the second inclined portions may be respectively continuous and formed in a bent shape.

Accordingly, both the inclined portions can be formed by sheet metal working. In addition, since there is no seam between the inclined portions, smooth insertion of the male terminal can be realized, and contact wear that occurs when there is a seam does not occur.

The first-direction opening and the second-direction opening may be continuous and formed in a L-shaped opening.

Accordingly, shape conditions required for the pluggable plug are relaxed, and many types of plugs may be accepted. That is, versatility of the receptacle is improved.

REFERENCE SIGNS LIST

10 receptacle
13 first guide hole
14 second guide hole
21 first-direction opening
22 second-direction opening
30 female terminal
33*a* to 33*d* arm portion
34*a* to 34*b* arm portion pair
35 first inclined portion
36 second inclined portion
90 plug
94 male terminal
D1 first insertion and pulling-out direction
D2 second insertion and pulling-out direction
La first position
Lb second position
Lc third position
Ld fourth position
P point (point included in contact position)

The invention claimed is:

1. A receptacle comprising:

a first-direction opening configured to accommodate a male terminal of a plug when the male terminal is inserted into the first-direction opening along a first insertion and pulling-out direction;

a second-direction opening configured to accommodate the male terminal when the male terminal is inserted into the second-direction opening along a second insertion and pulling-out direction different from the first insertion and pulling-out direction; and a female terminal configured to come into contact with the male terminal when the male terminal is inserted into either of the first-direction opening or the second-direction opening, wherein the female terminal includes a plurality of arm portion pairs that make contact with the male terminal when the male terminal is inserted into the second second-direction opening, each of the plurality of arm portion pairs having corresponding arm portions extending the first insertion and pulling-out direction and arranged to face each other, the plurality of arm portion pairs being arranged in the second insertion and pulling-out direction, wherein the corresponding arm portions of each of the arm portion pairs are arranged to face each other across a gap configured to accommodate the male terminal when the male terminal is inserted into the first-direction opening along the first insertion and pulling-out direction or when the male terminal is inserted into the second-direction opening along the second insertion and pulling-out direction, wherein each of the plurality of arm portion pairs has contact positions configured to come into contact with the male terminal when the male terminal is inserted into the second-direction opening, and wherein the contact positions of one of the plurality of arm portion pairs are different from the contact positions of another of the plurality of arm portion pairs in the first insertion and pulling-out direction.

2. The receptacle according to claim 1, wherein the contact positions are disposed at a tip ends of the arm portions, respectively, and wherein a length of the one of the plurality of arm portion pairs in the first insertion and pulling-out direction is different from a length of the other of the plurality of arm portion pairs in the first insertion and pulling-out direction.

3. The receptacle according to claim 1, wherein the contact positions are respectively provided on both the arm portions facing each other and have a protruding shape facing each other.

4. The receptacle according to claim 1, wherein each of the plurality of arm portion pairs includes first inclined portions configured to widen a facing distance toward the first-direction opening at end portions on a side close to the first-direction opening of the facing arm portions, and second inclined portions configured to widen a facing distance toward the second-direction opening at end portions on a side close to the second-direction opening of the facing arm portions.

5. The receptacle according to claim 4, wherein the second inclined portions extend from the contact positions of the arm portions toward the second-direction opening, respectively.

6. The receptacle according to claim 4, wherein the contact positions, the first inclined portions, and the second inclined portions are respectively continuous and formed in a bent shape.

7. The receptacle according to claim 1, wherein the first-direction opening and the second-direction opening are continuous and formed in a L-shaped opening.

8. A connector comprising:

the receptacle according to claim 1; and a plug including the male terminal configured to be inserted into the first-direction opening or the second-direction opening.

9. The connector according to claim 8, wherein the male terminal includes two flat portions and an insertion end portion that connects ends of the two flat portions with a curved surface of the male terminal.

* * * * *